(12) United States Patent
Briggs (10) Patent No.: US 10,703,106 B2
(45) Date of Patent: Jul. 7, 2020

(54) INK JET PRINTER AND METHOD OF PRIMING

(71) Applicant: Linx Printing Technologies Ltd., St. Ives, Cambridgeshire (GB)

(72) Inventor: Craig Briggs, St. Ives (GB)

(73) Assignee: Linx Printing Technologies Ltd., Stocks Bridge Way (GB)

( * ) Notice: Subject to any disclaimer, the term of this patent is extended or adjusted under 35 U.S.C. 154(b) by 0 days.

(21) Appl. No.: 16/303,490

(22) PCT Filed: May 25, 2017

(86) PCT No.: PCT/GB2017/051466
§ 371 (c)(1),
(2) Date: Nov. 20, 2018

(87) PCT Pub. No.: WO2017/212216
PCT Pub. Date: Dec. 14, 2017

(65) Prior Publication Data
US 2020/0001610 A1    Jan. 2, 2020

(30) Foreign Application Priority Data

Jun. 7, 2016   (GB) .................................. 1609960.8

(51) Int. Cl.
*B41J 2/175* (2006.01)
*B41J 2/02* (2006.01)
*C09D 11/30* (2014.01)

(52) U.S. Cl.
CPC ............ *B41J 2/17503* (2013.01); *B41J 2/02* (2013.01); *B41J 2/175* (2013.01); *C09D 11/30* (2013.01)

(58) Field of Classification Search
CPC .......... B41J 2/17503; B41J 2/02; B41J 2/175; C09D 11/30
See application file for complete search history.

(56) References Cited

U.S. PATENT DOCUMENTS 5,581,287 A * 12/1996 Baezner ............... B41J 2/17506
                                                                141/18
2005/0264620 A1* 12/2005 Kuester ............... B41J 2/16552
                                                                347/84
2010/0208013 A1   8/2010 Zaba et al.
(Continued)

FOREIGN PATENT DOCUMENTS

CN        205044308       2/2016
EP         2588323        5/2013
(Continued)

*Primary Examiner* — Yavoi M Ameh
(74) *Attorney, Agent, or Firm* — Lathrop GPM, LLP (57) ABSTRACT

A continuous inkjet printer has an ink circuit comprising an ink tank, an ink pump and a Venture suction device. The Venturi is used to suck an extra solvent or ink as required. However, if the ink tank is empty, no ink can be pumped through the Venture and so it will not develop suction and thus, cannot be used to suck in an initial supply of ink to an empty tank. A removable ink container may be connected to the ink tank or elsewhere in the ink circuit, for example, between the Venturi outlet and the pump inlet. Compressing the ink container manually will force ink into the ink circuit. When enough ink has been added, the pump will drive ink through the Venturi and suction will be generated.

12 Claims, 9 Drawing Sheets

(56) References Cited

U.S. PATENT DOCUMENTS

2013/0127958 A1* 5/2013 Plummer ................ B41J 2/175
                                                        347/92
2015/0145928 A1   5/2015 Stamp et al.

FOREIGN PATENT DOCUMENTS

| GB | 2447919 | 10/2008 |
| GB | 2481599 | 1/2012  |

* cited by examiner

INK JET PRINTER AND METHOD OF PRIMING

TECHNICAL FIELD

The present invention relates to a continuous ink jet printer, for example an electrostatic deflection type continuous ink jet printer.

BACKGROUND

In the operation of a continuous ink jet printer, a continuous jet of ink drops is formed. Usually, the drops are deflected in flight so that only some drops are used for printing. Drops of ink that are not required for printing are caught by a gutter and are returned to an ink tank within the main body of the printer. In an electrostatic deflection ink jet printer, this deflection is performed by trapping electric charges on some or all of the drops of ink, and using an electrostatic field to deflect the charged drops so that the printer prints the desired printed pattern. The ink includes a solvent which is normally highly volatile so that the drops of ink dry quickly after printing. The solvent also tends to evaporate from the ink that is caught in the gutter and returned to the ink tank, so that the ink used by the printer loses solvent over time. In order to maintain the correct ink viscosity, additional solvent is added from time to time. Additionally, the ink is slowly used up as the printer prints and therefore the ink in the ink tank needs to be replenished.

In order to stop and start the ink jet, and perform other operations such as adding ink and solvent, sucking air into the ink gun used to form the ink jet, and to apply or withdraw suction from the gutter, various valves are required within the ink system. The ink system will also normally include other electrical components, such as an ink pump for pressurising the ink and a pressure sensor for sensing the ink pressure. The suction for the gutter, and for applying suction to the interior of the ink gun if necessary, is often provided by a Venturi device which generates suction from the flow of ink through it. The ink is pumped through the Venturi by the ink pump, and the ink that flows through the Venturi is returned to the ink tank.

In order to add solvent to the ink in the ink tank from time to time, it is possible to provide a supply of solvent in a solvent tank and to use the Venturi device to suck a small amount of solvent from the solvent tank into the ink that flows through the Venturi and is returned to the ink tank. When the solvent tank gets low it can be topped up by the operator. In a similar way, the ink in the ink tank can be topped up by the operator as necessary. However, owing to the possibility of spills it is preferred to fit a removable solvent container such as a bottle or cartridge into the machine, and similarly to fit a removable ink container, such as a bottle or cartridge into the machine, and arrange for the printer to withdraw solvent and ink from the containers as necessary. The containers are replaced by the operator when they are empty. The likelihood of substantial spills of ink or solvent is reduced because the operator should only be handling the removable containers either when they are full and sealed or when they are empty. The ink and solvent containers can be arranged to supply ink and solvent reservoirs, from which the printer sucks ink and solvent as required, or the ink and solvent can be sucked directly from the containers.

It is known to hold the ink and solvent containers in the printer with a substantially liquid-tight seal, so as to minimise the possibility of spillage from the containers especially if the printer is tilted or jolted as it is carried from one place to another. However, systems in which the ink and solvent containers are sealed into the ink system of the printer typically have the effect that ink and solvent must be sucked out of the containers without the possibility of air entering the containers to replace the volume of liquid that is removed. Consequently, the containers have to deform so that their internal volumes reduce as liquid is removed. Therefore the suction applied to remove ink and solvent from the containers must be sufficient to overcome the containers' resistance to deformation. In practice, the suction provided by a Venturi is usually adequate for this purpose and it is known to suck solvent from a sealed reservoir and/or container using a Venturi. However, the Venturi only generates suction when ink is flowing through it. This means that the Venturi cannot be used to suck liquid from a container when the printer is initially being commissioned or at any other time when there is little or no ink in the ink tank, because the ink pump cannot pump ink through the Venturi to generate suction under these circumstances. Therefore, it is known to suck ink out of the ink container using a diaphragm pump, which has the advantage that it can develop adequate suction to remove ink from the ink container without needing already to contain ink in order to operate.

SUMMARY

Aspects and embodiments of the present invention provide systems in which an arrangement is made enabling an initial charge of ink to be added to the ink tank or supplied to the ink pump, thereby enabling ink to be pumped through a device for developing suction (e.g. a Venturi), which can then develop sufficient suction to suck ink from an ink container in subsequent operation of the printer. In this way, the need to provide a diaphragm pump to suck ink from the ink container is avoided. This can save cost and space in the printer.

In an aspect of the invention a continuous ink jet printer has an ink circuit comprising an ink tank, an ink pump and a suction device that generates suction from a flow of liquid through it, such as a Venturi. The suction device is used to suck in extra solvent or ink as required. However, if the ink tank is empty, no ink can be pumped through the suction device and so it will not develop suction. Therefore the suction device cannot be used to suck in an initial supply of ink to an empty tank. This problem is overcome by connecting a removable ink container to the ink tank or elsewhere in the ink circuit, preferably between the outlet of the suction device and the inlet to the pump, and then compressing the ink container manually to force ink into the ink circuit. When enough ink has been added, the pump will drive ink through the suction device and suction will be generated.

In another aspect of the present invention there is provided a continuous ink jet printer having an ink tank, an ink pump and a suction device (such as a Venturi) that develops suction from the flow of ink through it, arranged in an ink flow circuit such that ink is withdrawn from the ink tank by the ink pump, and is pumped by the ink pump through the suction device and back to the ink tank. The printer has a first fitting to allow a removable ink container to be connected for supply of ink to the ink flow circuit at a supply position. Additionally, either (a) the first fitting is also connected, via a first valve, to a suction inlet of the suction device and the printer has a second valve to selectively block or permit flow of fluid between the fitting and the supply position, the flow from the fitting to the supply position not being via the first valve or (b) the printer has a second fitting connected via a first valve to a suction inlet of the suction device, the second fitting allowing a removable ink container to be connected for supply of ink to the suction inlet of the suction device. Preferably the supply position is downstream of the outlet of the suction device and upstream of the inlet of the ink pump, and is most preferably at the ink tank.

Preferably, the fitting that allows ink to be added to the ink flow circuit at the supply position (the first fitting) is arranged to make a liquid-tight seal with an ink container, in order to minimise the risk of spillage. In order to transfer ink from the container into the ink flow circuit, the ink container may have flexible walls (which will typically be the case for an ink container to be used with a printer that sucks ink from the container while the container is held in a fitting with a liquid-tight seal), and the operator can squeeze the container in order to force some ink out of it.

It may be that the amount of ink initially in an ink container is different from the amount of ink to be transferred from the ink container into the ink flow circuit in order to enable sufficient flow through the suction device to develop suction. In this case, if the printer has a first fitting for supply of ink to the supply position and a second fitting for supply of ink to the suction inlet of the suction device, the operator may wish to remove the ink container from the first fitting while it still has some ink in it, in order to transfer the ink container to the second fitting. Accordingly, the first fitting may have a hollow spike suitable for piercing a re-sealable septum, and the ink container may have a re-sealable septum to be pierced by the hollow spike when the container is fitted to the fitting. Ink can then be transferred from the container through the hollow spike, for example by squeezing the container as mentioned above. When the container is removed, the re-sealable septum seals the hole made by the hollow spike, allowing the container to be removed without substantial spillage of ink.

Another aspect of the present invention provides a method of priming an ink flow circuit in a continuous ink jet printer, the ink flow circuit comprising an ink tank, an ink pump and a suction device that develops suction when ink is pumped through it and the printer having a connection for supply of ink to a suction inlet of the suction device, the method comprising adding ink manually from an ink container to a point in the ink flow circuit until there is sufficient ink in the ink tank for the ink pump to be able to withdraw ink from it and pump ink through the suction device. Preferably the point in the ink flow circuit, at which ink is added, is between the outlet of the suction device and the inlet of the ink pump, and most preferably it is at the ink tank.

Normally the interior of the ink tank is held close to atmospheric pressure by a vent. Therefore there is no significant pressure difference between the air outside the first fitting and the supply position in the ink flow circuit if the supply position is at the ink tank. If the supply position is between the suction device outlet and the ink tank, the pressure at the supply position will tend to be slightly above atmospheric pressure. If the supply position is between the ink tank outlet and the ink pump inlet, the pressure at the supply position will tend to be below atmospheric pressure. If the supply position is between the ink pump outlet and the suction device inlet, supply of ink may be possible if the ink pump is run backwards during the ink supply operation, so that the supply position is at a slight negative pressure and the ink flows from the supply position through the ink pump to the ink tank. However, in this case the supply position will normally be pressurised by the operation of the pump so as to be significantly above atmospheric pressure and at substantially the same pressure as the ink inside the ink gun that forms the ink jet. Therefore if the supply position is not at the ink tank, and the first fitting is not also connected to a suction inlet of the suction device but there is a second fitting connected to the suction inlet of the suction device so that the operator may wish to transfer an ink container from the first fitting to the second fitting, it may be useful to provide a sealing cap for the first fitting or possibly a valve between the first fitting and the supply position, in order to protect the ink circuit from exposure to atmospheric pressure at the supply position when the ink container is absent. Otherwise ink may tend to flow out through the first fitting or air may be sucked in owing to the pressure difference.

Preferably the printer also has a further fitting to allow a supply of solvent or diluent to be connected to a suction inlet of a suction device in the ink flow circuit. Preferably the further fitting is connected to a suction inlet of the same suction device as the first or second fitting is connected to, for the supply of ink. The further fitting may be connected to the same or a different suction inlet as the fitting for supply of ink.

Another aspect of the present invention provides a continuous ink jet printer comprising an ink tank, an ink pump and at least one suction device that creates suction from the flow of ink through it, the ink tank, the ink pump and the at least one suction device being provided in an ink circuit in which the ink pump can pump ink from the ink tank through the ink pump and then through the at least one suction device and then back to the ink tank, the printer further comprising: an ink top-up line connected to a suction inlet of the at least one suction device to allow ink to be sucked into the ink circuit, a solvent (diluent) top-up line connected to a suction inlet of the at least one suction device to allow solvent (diluent) to be sucked into the ink circuit, and a first fitting for connecting an ink container to the ink tank or to a location in the ink circuit between an outlet of the at least one suction device and an inlet of the ink tank or to a location in the ink circuit between an outlet of the ink tank and an inlet of the ink pump or to a location in the ink circuit between an outlet of the ink pump and an inlet of the at least one suction device.

Another aspect of the present invention provides a method of priming an ink circuit in a continuous ink jet printer, wherein the ink circuit comprises an ink tank, an ink pump and at least one suction device that creates suction from the flow of ink through it, and wherein the printer further comprises: an ink top-up line connected to a suction inlet of the at least one suction device to allow ink to be sucked into the ink circuit, a solvent (diluent) top-up line connected to a suction inlet of the at least one suction device to allow solvent (diluent) to be sucked into the ink circuit, and a first fitting for connecting an ink container to the ink tank or to a location in the ink circuit between an outlet of the at least one suction device and an inlet of the ink tank or to a location in the ink circuit between an outlet of the ink tank and an inlet of the ink pump or to a location in the ink circuit between an outlet of the ink pump and an inlet of the at least one suction device, the method comprising placing an ink container in the first fitting and compressing it to force ink from the ink container through the first fitting into the ink circuit.

Further aspects and optional features are set out in the accompanying claims.

The printer usually comprises means for deflecting the ink drops in flight, so that different drops can travel to different destinations. Typically, the ink is electrically conductive when wet, and the printer comprises an arrangement of electrodes to trap electric charges on the ink drops and create electrostatic fields in order to deflect the charged drops. This arrangement may include a charge electrode for trapping charges on the ink drops and deflection electrodes for creating an electric field that deflects the drops according to the level of trapped charge.

Normally the print head of the ink jet printer is separate from the main printer body and is connected to the main printer body by a flexible connector sometimes known as a conduit or umbilical that carries fluid and electrical connections between the print head and the main printer body. The print head typically includes an ink gun that receives pressurised ink and allows it to exit through an orifice to form a jet of ink, a charge electrode for trapping electric charges on drops of ink, deflection electrodes for creating an electrostatic field for deflecting charged drops of ink, and a gutter for collecting drops of ink that are not used for printing. The umbilical will include fluid lines for providing pressurised ink to the ink gun and for applying suction to the gutter and transporting ink from the gutter back to the main printer body. Often it will include other fluid lines such as a purge line allowing suction to be applied to the ink gun if required to suck air in through the jet-forming orifice to remove a blockage or to empty the ink gun of ink, and a flush line for delivering solvent to the ink gun. Electrical connections may be provided, for example to drive a piezoelectric crystal or the like for imposing pressure vibrations on the ink jet in order to control the way in which the jet breaks into drops, electrical connections for the charge electrode and the deflection electrodes, and connections may also be provided for drive currents for any valves in the print head. Accordingly, the umbilical carries both electrical connections and fluid connections.

BRIEF DESCRIPTION OF THE DRAWINGS

Embodiments of the present invention, given by way of non-limiting example, will now be described with reference to the accompanying drawings.

DETAILED DESCRIPTION

Figure 1:
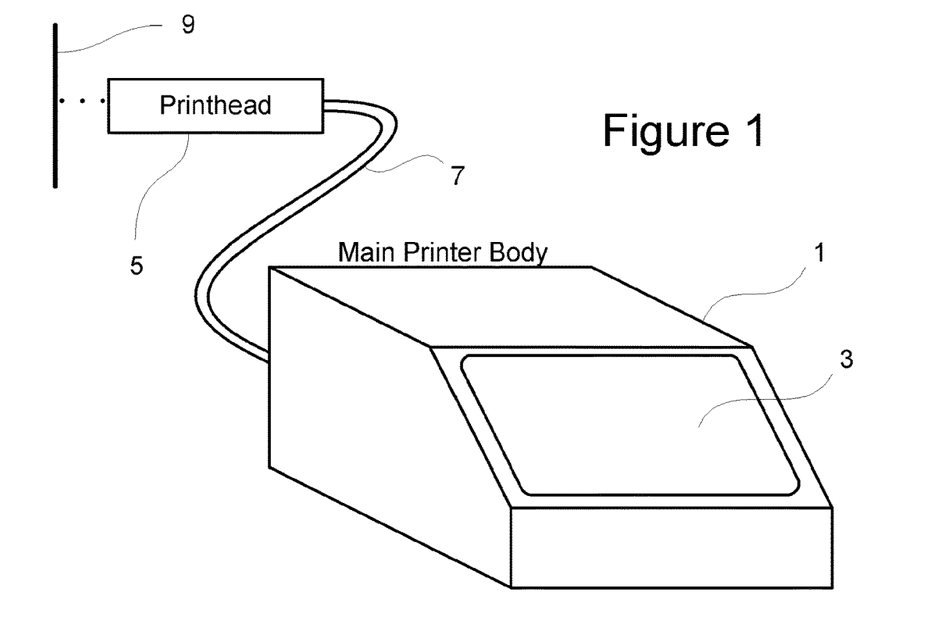
FIG. 1 shows an ink jet printer embodying the present invention.

FIG. 1 shows an electrostatic deflection type continuous ink jet printer. The printer forms a continuous jet of ink and has an arrangement of electrodes for charging drops of ink and deflecting the drops electrostatically in order to print a desired pattern. The main fluid and electrical components are housed within a main printer body 1. An operator communicates with the printer via a touchscreen display 3. The ink jet is formed within a print head 5, which also includes the electrode arrangement for charging and deflecting the ink drops, and the print head 5 is connected to the main printer body 1 by a flexible connection 7 known as a conduit or an umbilical. Drops of ink, deflected as necessary to create the desired pattern, travel from the print head 5 and strike the surface 9 of an object conveyed past the print head 5, in order to print the desired pattern on the surface 9 of the object.

Figure 2:
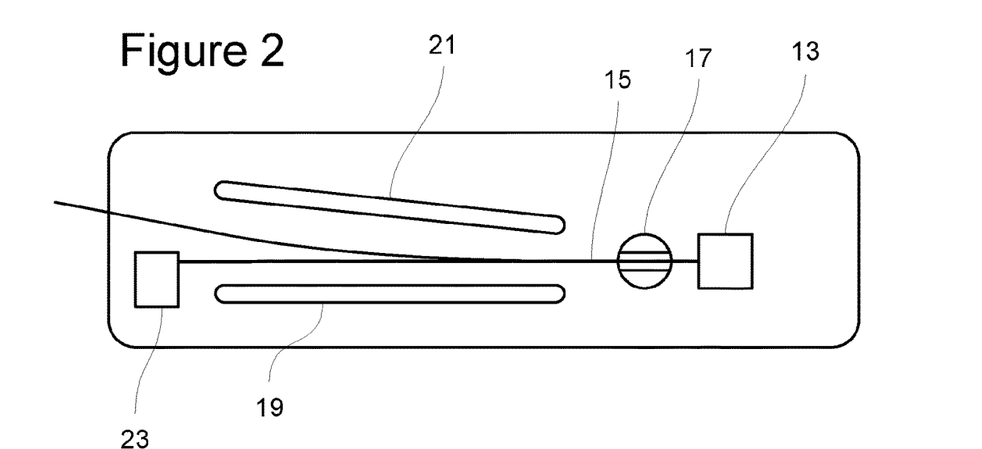
FIG. 2 is a schematic top view of the print head of the printer of FIG. 1.
Figure 3:
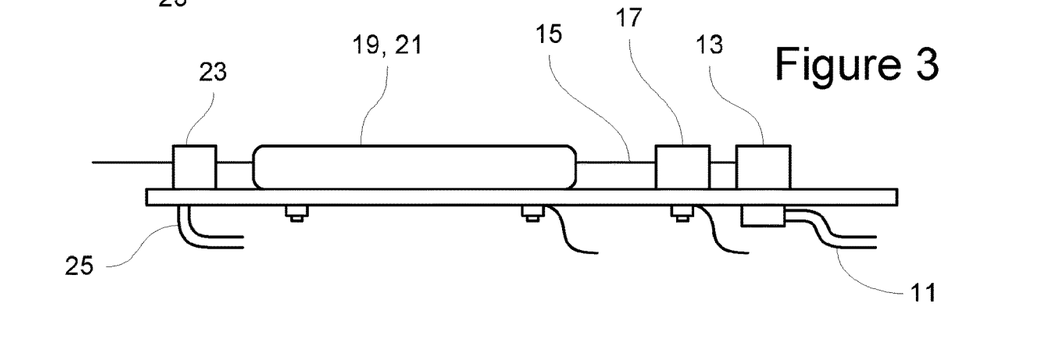
FIG. 3 is a schematic side view of the print head of the printer of FIG. 1.

FIG. 2 is a schematic top view and FIG. 3 is a schematic side view of the main components of the print head 5. Pressurised ink, delivered from the main printer body 1 through the umbilical 7, is provided via an ink feed line 11 to an ink gun 13. The pressurised ink leaves the ink gun 13 through a small jet-forming orifice to form an ink jet 15. Provided that pressurised ink is received by the ink gun 13 and any valves in the ink gun 13 are in the appropriate state, the ink jet 15 is formed continuously. Accordingly, this type of ink jet printer is known as a continuous ink jet printer, by contrast with a drop-on-demand printer in which a drop of ink is ejected only when a dot is to be printed.

Although the ink jet 15 leaves the ink gun 13 as a continuous unbroken stream of ink, it rapidly breaks into separate drops. The path of the ink jet passes through a slot in a charge electrode 17, which is positioned so that the ink jet 15 separates into drops while it is in the slot through the charge electrode 17. The ink is electrically conductive and the ink gun 13 is held at a constant voltage (typically ground). Accordingly, any voltage applied to the charge electrode 17 induces a charge into the part of the ink jet 15 that is in the slot of the charge electrode 17. As the ink jet 15 separates into drops, any such charge is trapped on the drops. Accordingly, the amount of charge trapped on each drop can be controlled by changing the voltage on the charge electrode 17.

The ink jet 15 then passes between two deflection electrodes 19, 21. A large potential difference (typically several kilovolts) is applied between those electrodes 19, 21 to provide a strong electric field between them. Accordingly, the drops of ink are deflected by the electric field and the amount of deflection depends on the amount of charge trapped on each drop. In this way, each ink drop can be steered into a selected path. As shown in FIG. 2, uncharged ink drops, which pass through the electric field without deflection, travel to a gutter 23 where they are caught. Suction is applied to the inside of the gutter 23 by a suction line 25, and so the ink received by the gutter 23 is sucked away and returned through the umbilical 7 to the main printer body 1, for reuse.

Drops of ink that are deflected by the field between the deflection electrodes 19, 21, so as to miss the gutter 23, leave the print head 5 and form printed dots on the surface 9 of the object.

Figure 4:
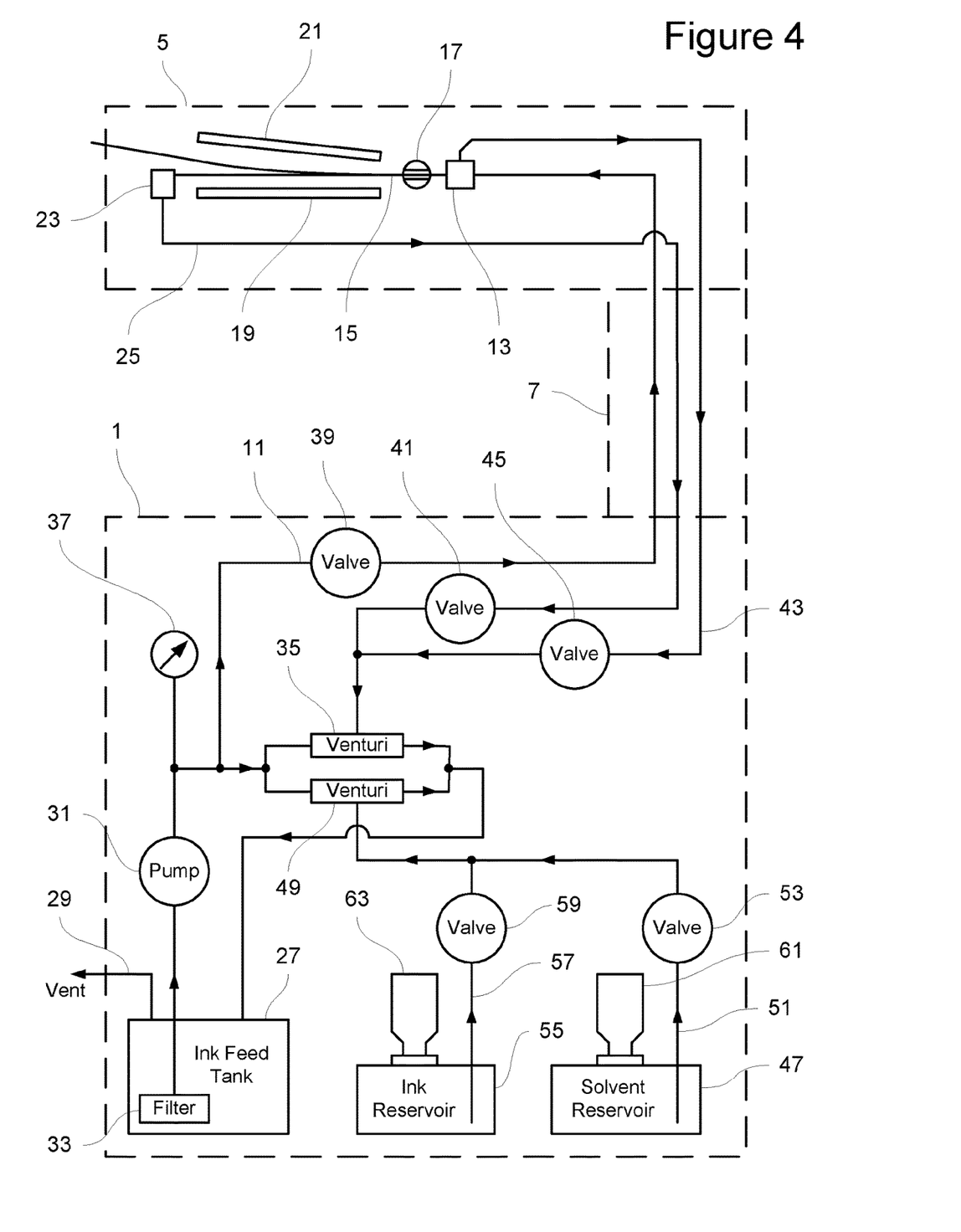
FIG. 4 shows simplified schematic diagram of the ink system (fluid system) of the printer of FIG. 1.

FIG. 4 is a simplified schematic diagram of a fluid system for the ink jet printer of FIG. 1. Ink is held in an ink feed tank 27 in the main printer body 1. The interior of the ink feed tank 27 is held at atmospheric pressure by a vent 29. Ink is sucked out of the ink feed tank 27 by a pump 31, via a filter 33. The ink, pressurised by the pump 31, flows through a first Venturi 35 and back to the ink feed tank 27. Ink will flow continuously around this loop as long as the pump 31 is running. The flow of ink through the first Venturi 35 generates suction. A pressure transducer (pressure sensor) 37 is used to sense the ink pressure on the outlet side of the ink pump 31.

The ink feed line 11 is also connected to the outlet side of the ink pump 31 and receives pressurised ink. A main ink feed valve 39 in the main printer body 1 controls the flow of ink to the print head 5 through the ink feed line 11. The gutter suction line 25 returns ink from the gutter 23 through the umbilical 7 to the main printer body 1, and receives suction from the first Venturi 35. Fluid flow in the gutter suction line 25 is controlled by a gutter valve 41. The first Venturi 35 also provides suction to a purge line 43, which passes through the umbilical 7 to the print head 5 in order to apply suction to the interior of the ink gun 13 when required. Flow in the purge line 43 is controlled by a purge valve 45.

During operation of the printer, the solvent in the ink used to form the ink jet 15 tends to evaporate, causing a change in the viscosity of the ink. In order to restore the ink to the correct viscosity, it is necessary to add further solvent from time to time. Spare solvent is held in a solvent reservoir 47 which receives suction from a second Venturi 49 through a solvent top-up line 51. The second Venturi 49 is preferably provided in parallel with the first Venturi 35, as shown in FIG. 4. In order to add solvent to the ink, a solvent top-up valve 53 in a solvent top-up line 51 is opened briefly, allowing the second Venturi 49 to suck a small quantity of solvent from the solvent reservoir 47. Solvent sucked in by the second Venturi 49 joins the ink flow through the Venturi and therefore passes into the ink feed tank 27, so as to dilute the ink in the ink feed tank.

It is possible to provide suction to the solvent top-up line 51 from the first Venturi 35, but it is preferred to use a separate Venturi for top-up operations because these operations tend to have a different suction requirement (lower flow rate at greater suction) from the gutter suction line 25.

As the ink jet printer prints, it will slowly use up ink from the ink feed tank 27. When the ink level becomes too low, the ink feed tank 27 is topped up from an ink reservoir 55. Ink is sucked out of the ink reservoir 55 by the second Venturi 49 via an ink top-up line 57, controlled by an ink top-up valve 59, in a similar manner to the operation for topping up with solvent from the solvent reservoir 47. The solvent reservoir 47 and the ink reservoir 55 are respectively supplied from a solvent container 61 in the form of a removable bottle or cartridge and an ink container 63 in the form of a removable bottle or cartridge, and the operator replaces the cartridges 61, 63 as necessary.

In order to minimise spillages, it is preferred that the solvent reservoir 47 and the ink reservoir 55 are sealed, and the solvent cartridge 61 and the ink cartridge 63 are fitted to the respective reservoirs 47, 55 with liquid-tight seals. This has the consequence that, when the second Venturi 49 sucks ink or solvent from the respective reservoirs 47, 55, there is no path for air to flow into the reservoirs 47, 55 or the solvent or ink container 61, 63 to replace the volume of liquid that has been withdrawn. Consequently, the ink and solvent containers 61, 63 are provided as deformable cartridges which will collapse as liquid is sucked out of them. The second Venturi 49 develops sufficient suction to overcome any stiffness in the material of the cartridges 61, 63 and is therefore able to suck ink and solvent from the reservoirs 47, 55 while forcing the ink and solvent containers 61, 63 to deform.

In practice, it is not always necessary to provide the solvent reservoir 47 and the ink reservoir 55, and the respective top-up lines 51, 57 may be connected directly to the containers 61, 63.

Figure 5:
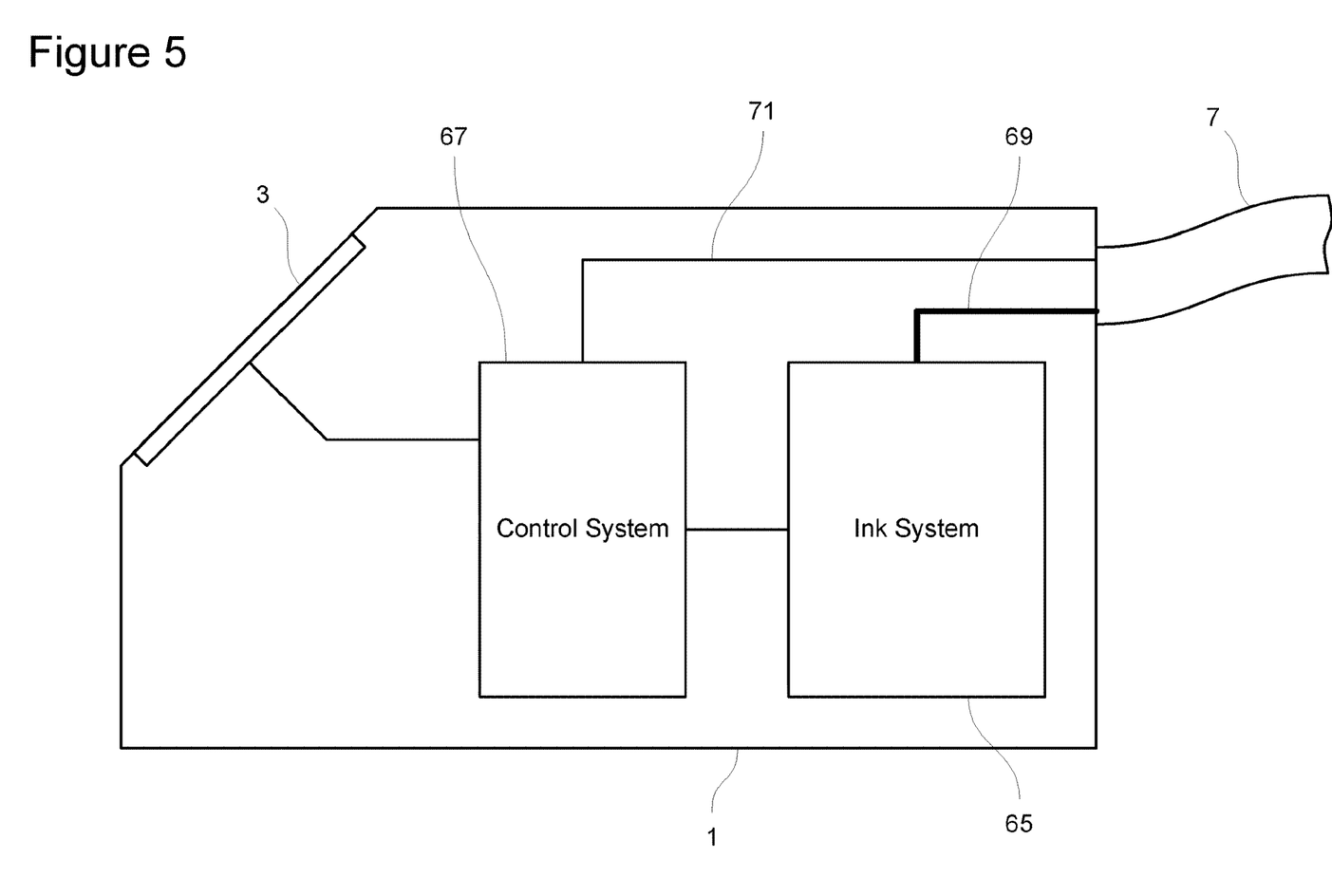
FIG. 5 shows the main components inside the main body of the printer of FIG. 1.

FIG. 5 shows schematically some of the components inside the main body 1 of the printer. The printer has a main body ink system 65, which includes the components in FIG. 4 that are shown inside the main printer body 1. The main body ink system 65 and other parts of the printer operate under the control of a control system 67. The control system 67, for example, sends drive currents to the ink pump 31 and to the various valves, 39, 41, 45, 53, 59 of the main body ink system 65. The control system 67 receives outputs from the pressure sensor 37 and also from level sensors in the ink feed tank 27, the solvent reservoir 47 and the ink reservoir 55. The control system 67 also provides outputs to, and receives inputs from, the touchscreen display 3.

Fluid lines 69 connect the main body ink system 65 to the print head 5 through the umbilical 7. These fluid lines will include the ink feed line 11, the gutter suction line 25 and the purge line 43 shown in FIG. 4. Electrical lines 71 connect the control system 67 to the print head 5 via the umbilical 7. These electrical lines will include lines for applying the appropriate voltages to the charge electrode 17 and the deflection of electrodes 19, 21, and a drive signal to a piezoelectric crystal inside the ink gun 13 that applies a vibration to the ink that forms the ink jet 15 in order to control the manner in which it breaks into drops.

Figure 6:
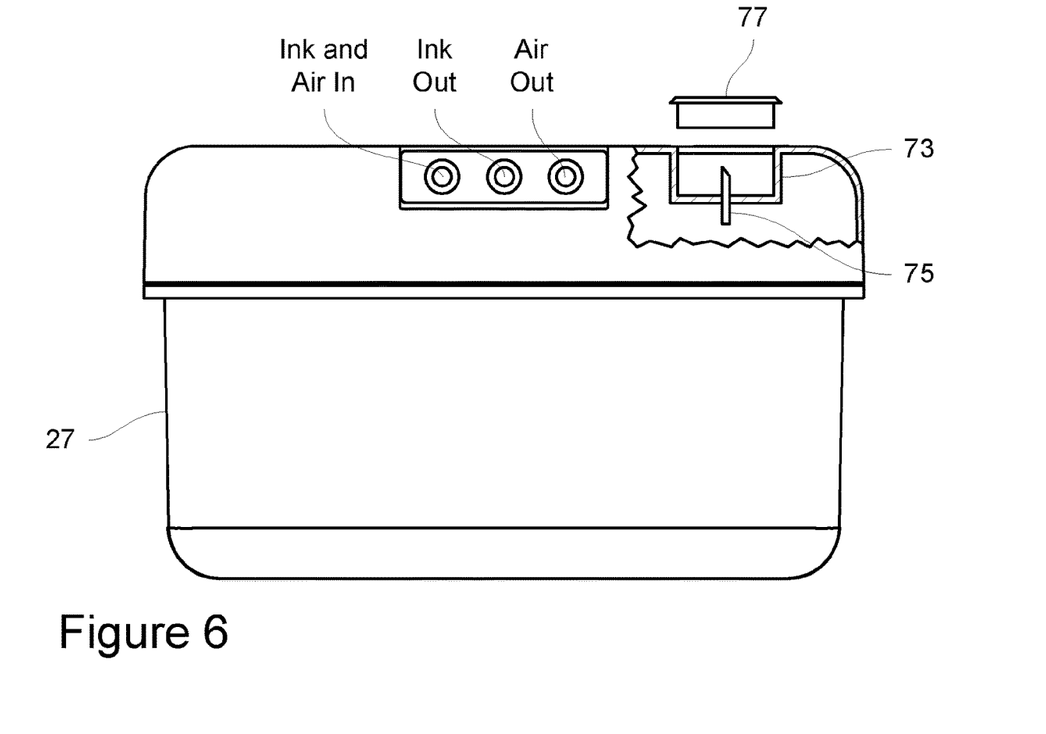
FIG. 6 is a side view of the ink tank.
Figure 7:
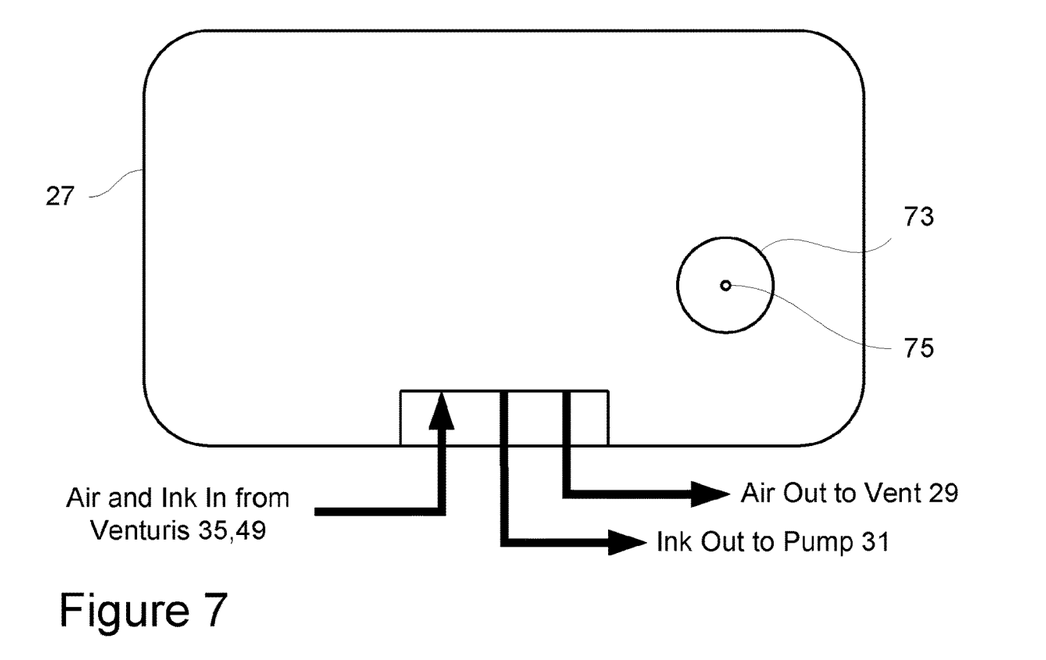
FIG. 7 is a top view of the ink tank.

FIG. 6 shows a side view of the ink feed tank 27 and FIG. 7 shows a top view of it. In this embodiment, the ink feed tank 27 is removable, and will be replaced from time to time during operation of the printer. This ensures that the filter 33 does not become clogged by the accumulation of dust or other particles in the ink that may enter the ink feed tank, for example via the gutter 23, during extended operation of the printer. However, when a fresh ink feed tank 27 is fitted into the printer it contains no ink. Even if the ink feed tank 27 is not removable, it may be necessary to drain it from time to time in order to remove degraded ink and to replace the ink filter 33, and after this operation the ink tank will contain no ink. Therefore it is necessary to supply ink to the ink feed tank 27 before the printer can begin operation. However, the second Venturi 49 is not able to suck ink out of the ink reservoir 55 and ink cartridge 63 in order to provide an initial charge of ink to the ink feed tank 27, because the second Venturi 49 cannot develop suction unless ink is flowing through it, and the ink pump 31 is unable to provide a supply of ink to the Venturis 35, 49 until there is some ink in the ink feed tank 27. Accordingly, the ink feed tank 27 is provided with a fitting (shown in more detail in FIG. 8) to enable an ink cartridge 63 to be connected directly to the ink feed tank 27, allowing ink to be transferred from the ink cartridge 63 into the ink feed tank 27. Because the printer is not able to provide any suction in this state, for sucking ink out of the ink cartridge, the operator transfers the ink manually. Since the ink cartridge 63 is deformable (as discussed above with reference to the operation of the second Venturi 49), the operator can simply squeeze the ink cartridge in order to force some ink out of it into the ink feed tank 27.

Figure 9:
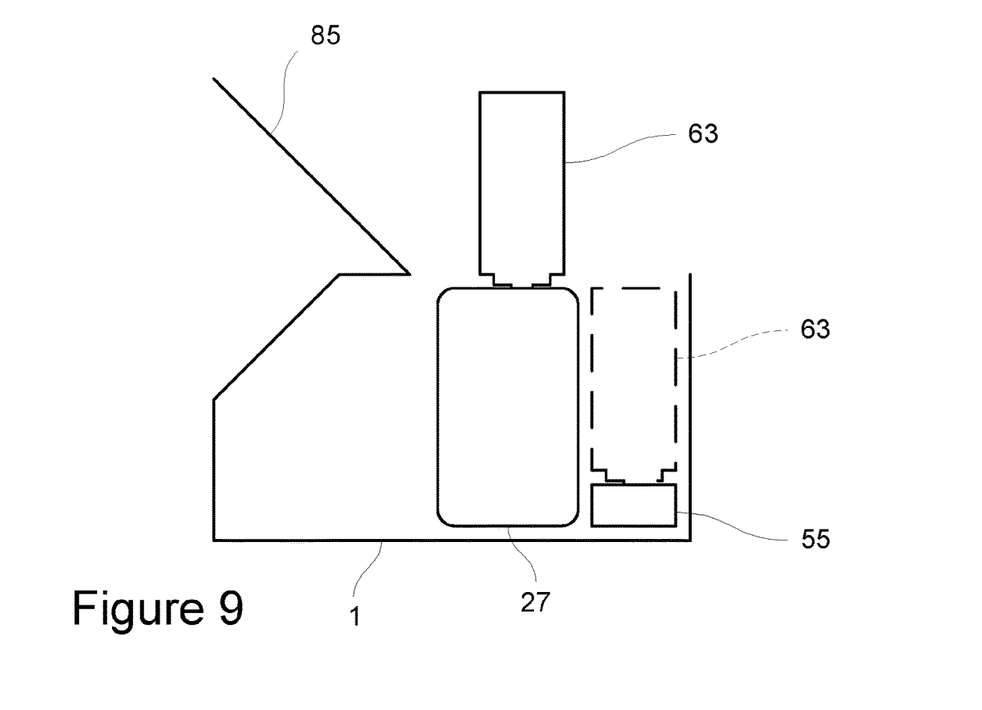
FIG. 9 shows the ink tank in the main body of the printer, with an ink cartridge fitted to it from which to add ink to the ink tank for priming.
Figure 10:
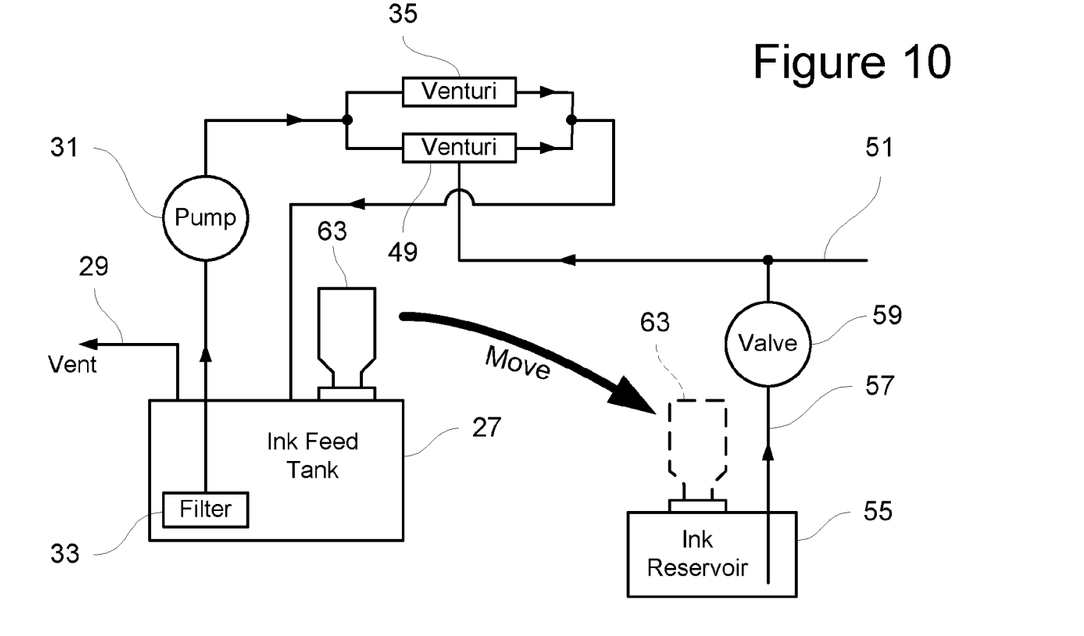
FIG. 10 is a schematic diagram of the main ink circuit from the ink system of FIG. 4, with the ink cartridge fitted to the ink tank.

FIG. 9 shows the ink feed tank 27 in the main printer body 1, with an ink cartridge 63 connected to the top of the ink feed tank for adding an initial supply of ink to the ink feed tank 27. FIG. 10 shows a part of the fluid system of FIG. 4, showing the ink cartridge 63 in its position connected to the ink feed tank 27 for adding an initial supply of ink to the ink feed tank 27.

Figure 8:
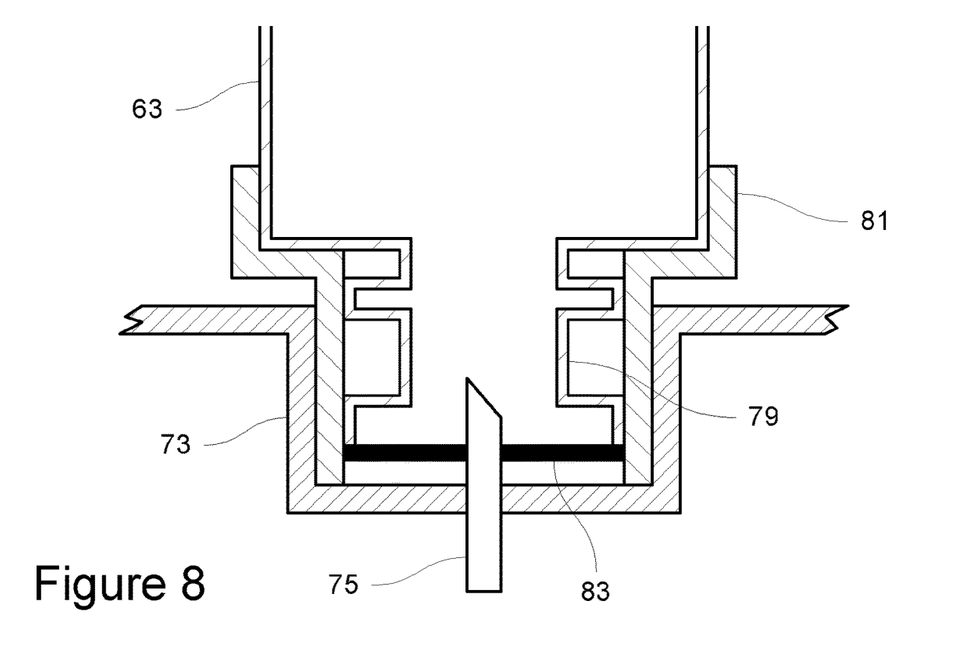
FIG. 8 is a detailed view of the fitting for allowing ink to be added to the ink tank for priming.

As shown in FIGS. 6 to 8, the fitting for the ink cartridge 63 comprises a recess 73 provided in the top of the ink feed tank 27, for receiving the mouth of the ink cartridge 63. In the centre of the recess, a hollow needle 75 sticks up from the floor of the recess 73, in order to pierce the seal across the mouth of the ink cartridge 63. Once the ink cartridge 63 has been fitted into the recess 73, the operator squeezes the ink cartridge 63 and ink flows from the ink cartridge 63 through the hollow needle 75 into the ink feed tank 27. The ink squeezed out of the ink cartridge 63 collects at the bottom of the ink tank 27.

Since the recess 73 is provided in the top of the ink feed tank 27, and the hollow needle 75 extends only a short distance down into the ink feed tank 27, the lower end of the hollow needle 75 remains in the air, and is not enclosed by the ink that collects in the ink feed tank 27. Accordingly, when the operator releases the ink cartridge 63 and it returns to its normal shape, the ink cartridge 63 sucks in air through the hollow needle 75 rather than sucking ink back in. Consequently, the operator can squeeze the ink cartridge 63 repeatedly to keep adding doses of ink to the ink feed tank 27 until a sufficient amount has been added to enable the ink pump 31 to withdraw ink from the ink feed tank 27 and drive it through the Venturis 35, 49. In this way, an initial supply of ink is provided to the ink feed tank 27, which primes the ink circuit (comprising the ink feed tank 27, the ink pump 31, the first Venturi 35 and the second Venturi 49) enabling the Venturis 35, 49 to create suction.

Once sufficient ink has been added to the ink feed tank 27 to prime the ink circuit, the operator can remove the ink cartridge 63 from the recess 73. The ink cartridge 63 can then be moved, as shown by the arrow in FIG. 10, to its normal position mounted on the ink reservoir 55 (as shown in broken lines in FIGS. 9 and 10). When the ink cartridge 63 has been removed from the recess 73, a lid 77 is fitted on the recess 73 in order to cover the sharp end of hollow needle 75 for safety and also to prevent dust and dirt from entering the ink feed tank 27 through the hollow needle 75.

FIG. 8 shows the recess 73, the hollow needle 75 and the mouth of the ink cartridge 63 in more detail. The ink cartridge 63 has a neck portion 79 that is shaped to cooperate with the fitting on the ink reservoir 55 that holds the ink cartridge 63 with a liquid-tight seal. In order to support the neck portion 79 of the ink cartridge and ensure that it fits properly into the recess 73, the operator fits an adapter 81 around the neck portion 79 of the ink cartridge 63. The operator then inserts the neck portion 79 of the ink cartridge 63, together with the adapter 81, into the recess 73 and presses the ink cartridge 63 down until the end of the adapter 81 contacts the bottom of the recess 73. In this position, the hollow needle 75 pierces the seal 83 across the mouth of the ink container 63, as shown in FIG. 8.

Preferably, the seal 83 across the mouth of the ink cartridge 63 is a re-sealable septum, and the hollow needle 75 is a suitable septum spike, so that the septum seals the hole created by the hollow needle 75 as the ink cartridge 63 is withdrawn from the recess 73, with the result that any ink remaining in the ink cartridge 63 does not spill out.

As shown in FIG. 9, the main printer body has a lid 85 that can be opened to allow replacement of the ink cartridge 63, the solvent cartridge 61 and the ink feed tank 27. When the ink cartridge 63 is received in the fitting in the top of the ink feed tank 27, it extends upwardly out of the main printer body 1 and the operator can easily grasp the sides of the ink cartridge 63 to squeeze it. When the ink cartridge is fitted to the ink reservoir 55, as shown in broken lines in FIG. 9, it is fully inside the main printer body 1 and the lid 85 can be closed.

The printer can guide the operator through this procedure via the touchscreen display 3. For example, the touchscreen display 3 may initially display instructions telling the operator to fit the adapter 81 to the neck portion 79 of the ink cartridge 63, and then to fit the ink cartridge 63 into the recess 73. Once the operator has informed the printer that the ink cartridge is fitted into the recess, the printer can operate the ink pump 31 and monitor the pressure detected by the pressure transducer 37. While the ink feed tank 27 is empty and the ink pump 31 is pumping air, the pressure detected by the pressure transducer 37 will be lower than the normal ink pressure during operation of the printer. Once the ink pump 31 begins to withdraw ink from the ink feed tank 27, the pressure detected by the pressure transducer 37 will increase. The system may wait until a pre-set minimum pressure is detected by the pressure transducer 37 while the ink pump 31 is running at a first speed, selected to ensure that the ink pump 31 is not damaged by pumping air. Once the initial pressure is detected in the pressure transducer 37 the ink pump 31 can be set to run at a second speed designed to pressurise the ink, and the ink pressure detected by the pressure transducer 37 is monitored by the control system 67 until a further pre-set pressure is detected that indicates that ink is flowing through the ink pump 31 and the first and second Venturis 35, 49 satisfactorily. At this point, the control system 67 can use the touchscreen display 3 to instruct the operator to stop adding further ink from the ink cartridge 63 to the ink feed tank 27 and can provide instructions telling the operator how to withdraw the ink cartridge from the recess 73 and how to fit it into the ink reservoir 55.

The fitting for connecting the ink cartridge 63 to the ink tank can take other forms. For example, the recess 73 may be absent and the hollow needle 75 may extend upwardly from the surface of the ink feed tank 27. However, it is preferred that there is a recess or a wall or other component extending at least partially around the hollow needle 75, both the help to hold the ink cartridge 63 in place when it is fitted on the hollow needle 75 and to improve safety by making the hollow needle less exposed.

In FIGS. 6 to 10, the ink cartridge is received into a fitting in the top of the ink feed tank 27 in order to prime the ink circuit. However, this is not the only possible arrangement for connecting the ink cartridge to the ink circuit for the priming operation.

Figure 11:
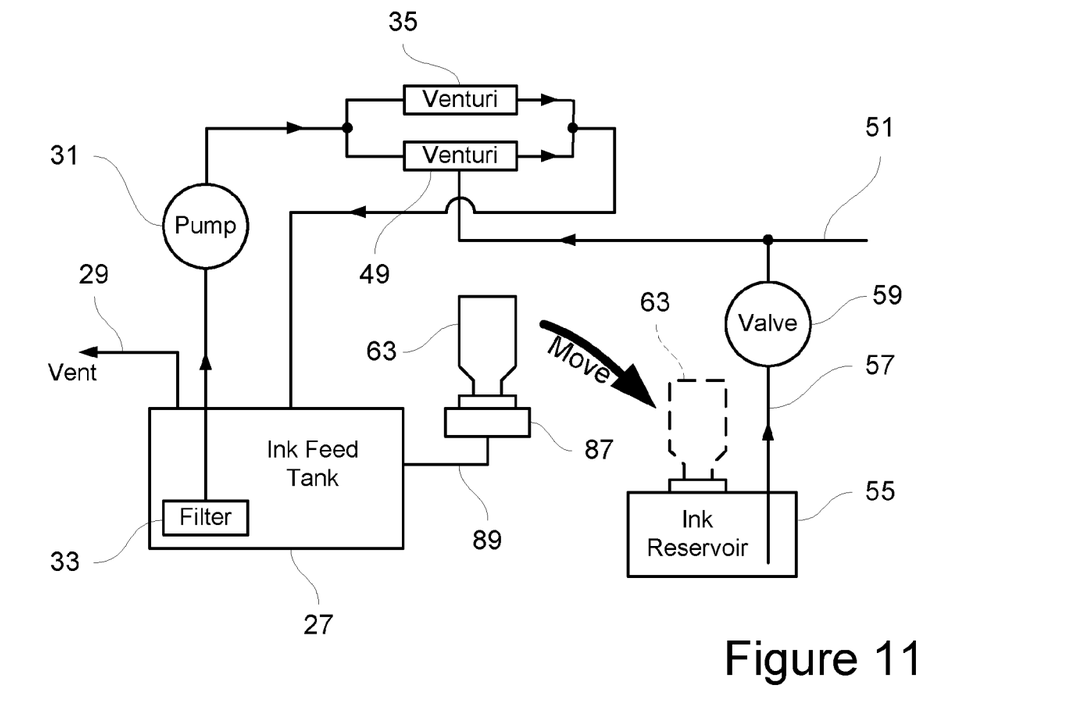
FIG. 11 is a schematic diagram of the main ink circuit from the ink system of FIG. 4, with the ink cartridge fitted to a priming connector that is connected to the ink tank.

An alternative arrangement is shown in FIG. 11. In FIG. 11, the fitting for the ink cartridge (i.e. the recess 73 and the hollow needle 75) is provided in a separate priming connector 87 for receiving the ink cartridge 63, and the priming connector 87 is connected to the ink feed tank 27 by a priming line 89. The priming line 89 is shown in FIG. 11 as connecting to the ink feed tank 27 at its side. The priming line 89 may alternatively connect to the ink feed tank 27 at its top, or may even connect at the bottom of the ink feed tank 27 and extend upwardly within the ink feed tank 27. In all cases, the end of the priming line 89 remote from the priming connector 87 should be sufficiently high up in the ink feed tank 27 that when the operator releases the ink cartridge after squeezing it, expansion of the ink cartridge 63 sucks in air from the interior of the ink feed tank 27 rather than sucking ink back in.

Figure 12:
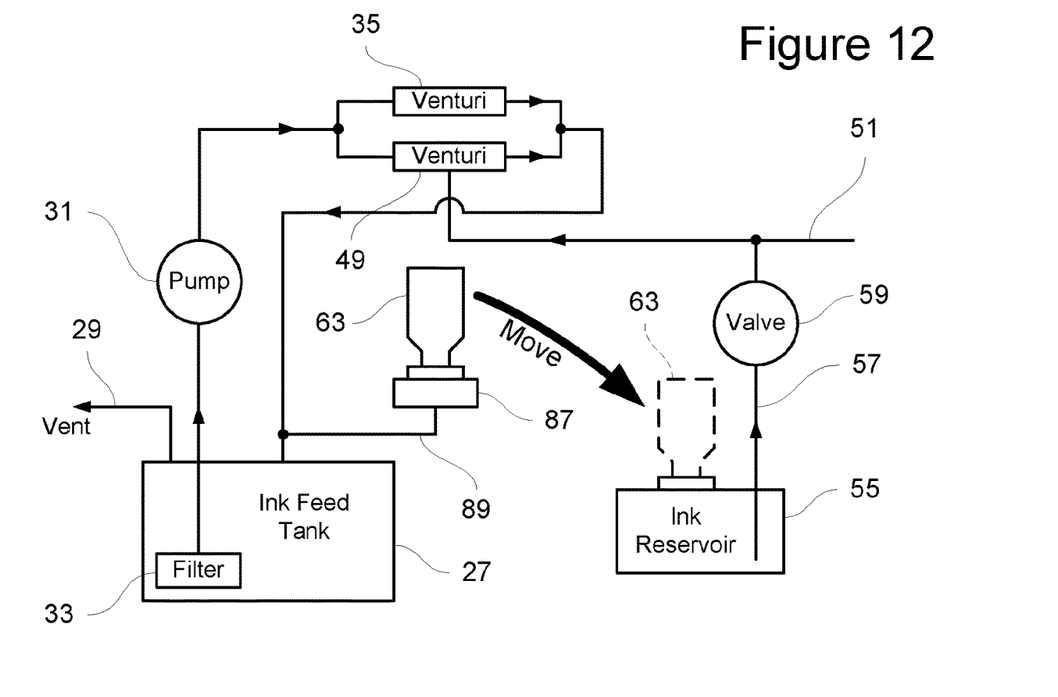
FIG. 12 is a schematic diagram of the main ink circuit from the ink system of FIG. 4, with the ink cartridge fitted to a priming connector that is connected to the line from the Venturis to the ink tank.

It is not necessary for the priming line 89 to be connected directly to the ink tank 27. FIG. 12 shows an alternative arrangement in which the priming line 89 joins the ink circuit at the fluid flow line between the output of the Venturis 35, 49 and the input to the ink feed tank 27. In this construction, when the operator squeezes the ink cartridge 63, ink will flow from it through the priming connector 87 and the priming line 89 to the junction with the line from the Venturis 35, 49 to the ink feed tank 27, and then into the ink feed tank 27.

As previously discussed, the ink pump 31 will be operating (although possibly at a reduced speed compared with normal) during the priming operation. Typically the ink pump 31 is a gear pump and its pumping ability will be reduced until it is wetted with ink. Nevertheless, it will cause some air flow through the Venturis 35, 49 and into the ink feed tank 27. Additionally, the gutter valve 41, the purge valve 45, the solvent top-up valve 53 and the ink top-up valve 59 connected to the suction inlets of the first and second Venturis 35, 49 will all be closed during the priming operation so that air cannot escape through the Venturis. On the other hand, the vent 29 ensures that the air pressure in the ink feed tank 27 remains close to atmospheric pressure and does not provide a substantial resistance to flow into and out of the ink feed tank 27. Consequently, when ink is squeezed out of the ink cartridge 63 during priming with the arrangement of FIG. 12, there is little or no tendency for the ink to flow towards the Venturis 35, 49 and it will flow reliably into the ink feed tank 27.

The priming line 89 can be connected elsewhere in the ink circuit. Preferably it is connected at a place between the outlet of the Venturis 35, 49 and the inlet of the ink pump 31, and accordingly in FIG. 13 it is shown connected in the line between the outlet of the ink feed tank 27 and inlet of the ink pump 31. The ink pump 31 and the ink feed tank 27 are arranged so that even when the ink pump 31 is not wet with ink, it is capable of withdrawing ink from the ink feed tank 27 into the ink pump 31 so that the ink pump 31 can pump the ink around the ink circuit once the ink feed tank 27 is primed with ink. Accordingly, when the operator squeezes the ink cartridge 63 when it is mounted on the priming connector 87 of FIG. 13, ink from the ink cartridge 63 flows through the priming line 89 into the line between the ink feed tank 27 and inlet of the ink pump 31, and it will then flow into the ink pump 31 in the same way as any ink that the ink pump 31 withdraws from the ink feed tank 27. The ink will wet the ink pump 31, improving its pumping ability. The ink will then be pumped through the first and second Venturis 35, 49 and into the ink feed tank 27. Because the ink pump 31 is running and is capable of ensuring that any ink flows into its inlet, air will flow from the ink feed tank 27 into the priming line 89 and the ink cartridge 63 when the operator releases the ink cartridge 63 and it expands, and ink will not be pulled back from the inlet of the pump 31.

Figure 13:
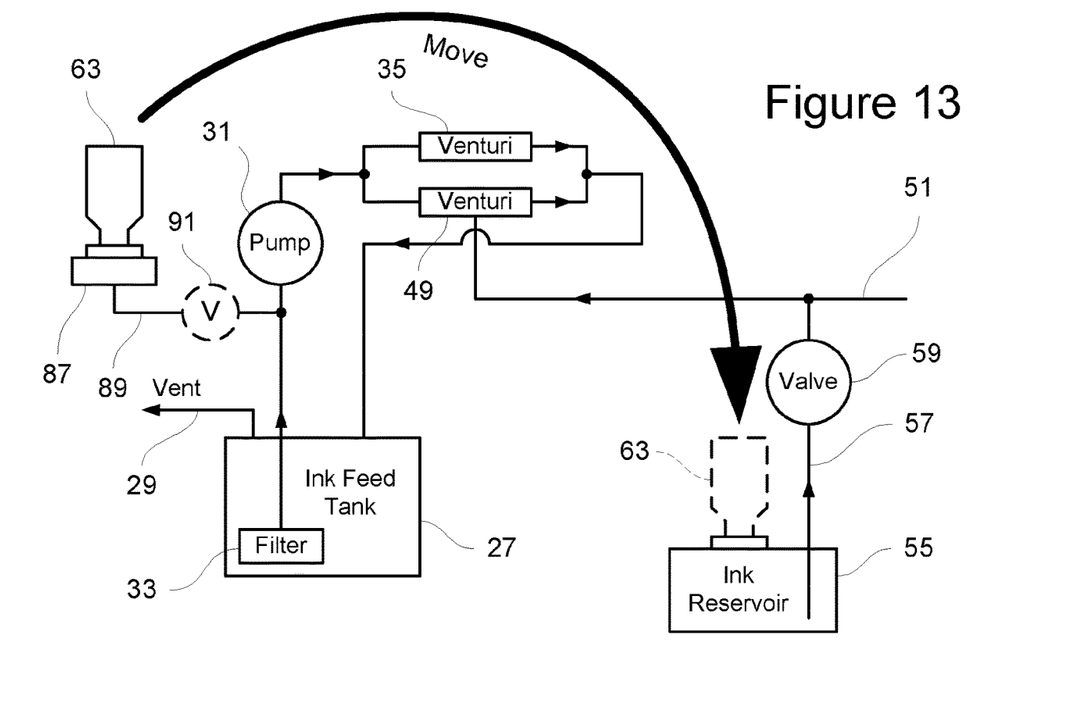
FIG. 13 is a schematic diagram of the main ink circuit from the ink system of FIG. 4, with the ink cartridge fitted to a priming connector that is connected to the line from the ink tank to the ink pump.

With the arrangement of FIG. 13, the ink pump 31 pumps ink as soon as the operator begins to transfer ink from the ink cartridge 63 into the ink circuit by squeezing the ink cartridge 63. Therefore the pressure at the outlet side of the pump 31 may be a less reliable way of detecting when sufficient ink has been fed into the ink feed tank 27 as compared with arrangements in which the ink flows from the ink cartridge 63 into the ink feed tank 27 without going via the ink pump 31. Accordingly, with the arrangement of FIG. 13 it is preferred that the control system 67 determines when sufficient ink has been transferred to the ink feed tank 27 to prime the ink circuit by monitoring the ink level in the ink feed tank 27 rather than by monitoring the ink pump outlet pressure using the pressure transducer 37.

It is less preferred to connect the priming line 89 to the ink circuit at a position between the outlet of the ink pump 31 and the inlets of the Venturis 35, 49. This part of the ink circuit is exposed to the full outlet pressure of the ink pump 31. While the pump 31 merely pumps air, the pressure at this part of the ink circuit is moderate, and the air flow will drive the ink, squeezed out of the ink cartridge 63, around the ink circuit and into the ink feed tank 27. However, as the amount of ink in the ink feed tank increases and ink begins to be sucked from the ink feed tank 27 into the ink pump 31, the outlet pressure of the ink pump 31 may increase. Therefore the ink container 63 may be exposed to unacceptable pressures if the priming line 89 is connected to this part of the ink circuit. However, it may be practical to connect the priming line 89 to this part of the ink circuit if the ink pump 31 can be operated in reverse during the priming operation, so that the ink container 63 is exposed to suction rather than to high pressure.

The arrangements of FIGS. 11 to 13, using the priming connector 87 and the priming line 89 rather than providing the recess 73 and hollow needle 75 directly on the ink feed tank 27, allow the recess 73 (or other fitting for connecting the ink container to the ink circuit for priming) to be positioned at a convenient location in the main printer body 1, and not necessarily at the same location as the ink feed tank 27. However, when the operator releases the ink cartridge 63 after squeezing, the ink cartridge 63 will suck the ink in the priming line 89 back into itself. It will also suck back any ink in the ink circuit between the point where the priming line 87 joins the ink circuit and the point in the ink circuit at which air is available. This reduces the volume of ink that is transferred from the ink cartridge 63 to the ink circuit and ultimately to the ink feed tank 27 with each squeeze of the ink cartridge 63. Therefore it is preferable to keep the priming line 89 as short as is reasonably possible, and to connect it to the ink circuit directly at the ink feed tank 27 or close to the inlet of the ink feed tank 27 or else between the ink feed tank 27 and the inlet of the pump 31, in order to minimise the volume of ink that is sucked back into the ink cartridge 63 each time it is released.

A lid 77 is used to close the recess 73 in the priming connector 87 in the arrangements of FIGS. 11 to 13, in the same way as in the arrangement of FIGS. 6 to 10. With the arrangement of FIGS. 6 to 11, the hollow needle 75 in the recess 73 connects to a point in the ink feed tank 27 that is held substantially at atmospheric pressure by the vent 29, and therefore the lid 77 is provided only for safety and to keep out dirt and dust and it does not need to be airtight. However, in the arrangements of FIGS. 12 and 13 the hollow needle 75 is connected through the priming line 89 to a point in the ink circuit which may not always be at atmospheric pressure and therefore the lid 77 preferably provides an airtight seal to prevent flow along the priming line 89 when the ink cartridge 63 is not present. It is particularly important to prevent flow along the priming line 89 during normal operation of the printer in the case of the arrangement of FIG. 13, since otherwise there is a danger that air could be sucked into the ink pump 31 through the priming line 87, mixing air bubbles into the ink that is ultimately supplied to the ink gun 13. This is undesirable because it would disrupt the ink jet 15. Additionally, it may be difficult to keep the ink pressure at the correct level. Accordingly, it may be desirable to provide an optional priming shut off valve 91 in the priming line 89, as shown in broken lines in FIG. 13.

During normal operation of the printer, the outlet pressure of the ink pump 31 provides the pressure that drives the ink jet 15 out of the ink gun 13. Therefore if the priming line 89 is connected to the ink circuit between the outlet side of the ink pump 31 and the inlet side of the Venturis 35, 49, it is particularly important to provide a liquid-tight seal for the lid 77 when the ink cartridge 63 is removed, or to provide the priming shut-off valve 91 in the priming line 89, in order to prevent ink from being forced out of the ink circuit at high pressure via the priming line 89 during normal operation of the printer.

Figure 14:
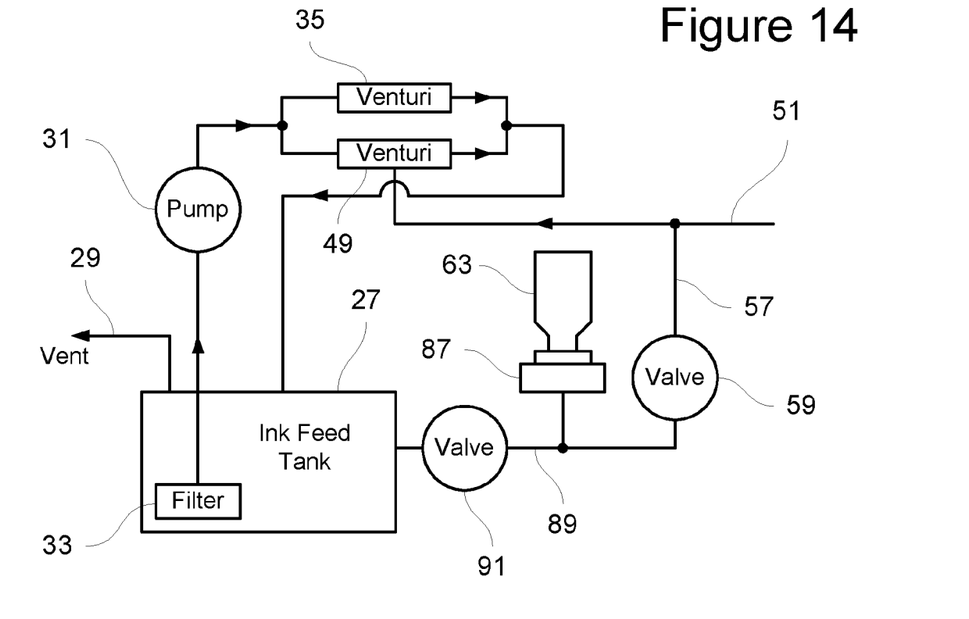
FIG. 14 is a modification of FIG. 11, in which the priming connector is also connected to the suction inlet of a Venturi for ink top-up.

With the arrangements of FIGS. 6 to 13, the ink cartridge 63 is moved from its position for priming the ink circuit to its position for allowing ink top-up via the second Venturi 49, as shown by the bold arrow in FIGS. 10 to 13. However, it may be more convenient for the operator if a single position can be provided for the ink cartridge 63 which can be used both for priming the ink circuit and for ink top-up via the second Venturi 49, so that the ink cartridge 63 does not have to be moved. FIG. 14 shows a modification of the arrangement to FIG. 11 in which only a single position for the ink cartridge 63 is required.

In FIG. 14, the priming connector 87 is connected both to the priming line 89 and to the ink top-up line 57. Accordingly, the ink cartridge 63 can remain in the priming connector 87 throughout normal operation of the printer, and the ink top-up valve 59 is opened in order to suck ink from the ink cartridge 63 through the second Venturi 49 and into the ink feed tank 27 whenever the level of ink in the ink feed tank 27 is too low. During the priming operation, the ink top-up valve 59 is closed, to ensure that ink flows along the priming line 89 when the ink cartridge 63 is squeezed. In the arrangement of FIG. 14, a priming shut off valve 91 is provided in the priming line 89. This valve is open during the priming operation, to allow ink to flow from the ink cartridge 63 along the priming line 89 and into the ink feed tank 27. However, it is important that the priming shut off valve 91 is closed during ink top-up operation, in order to ensure that suction from the second Venturi 49 is not applied to the interior of the ink feed tank 27 via the priming line 89.

Figure 15:
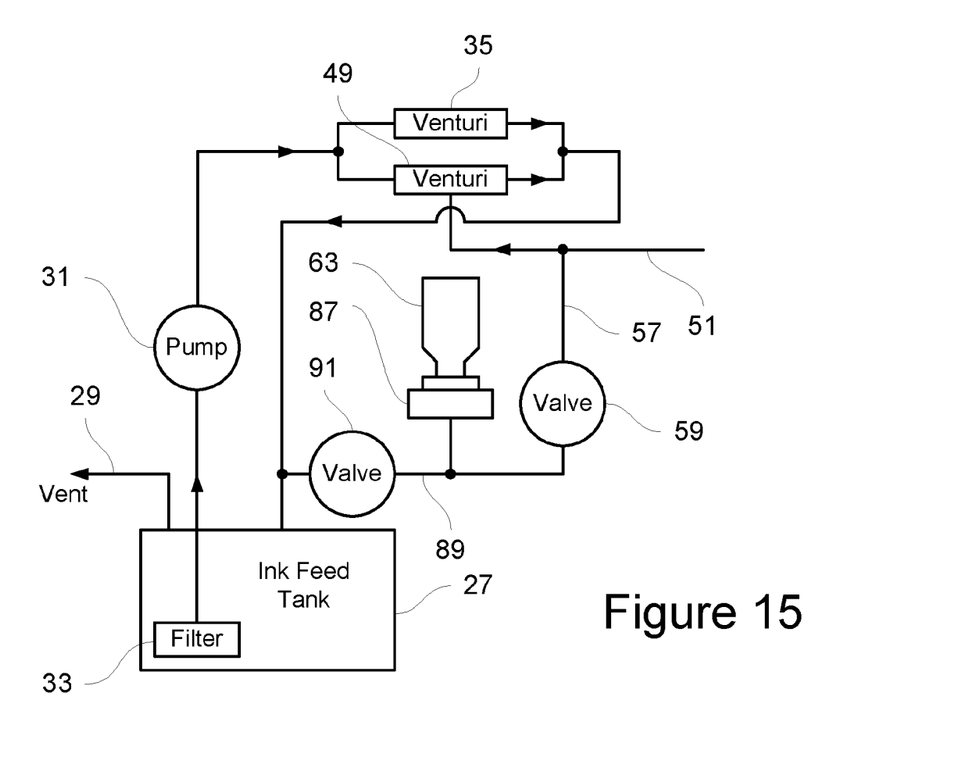
FIG. 15 is a modification of FIG. 12, in which the priming connector is also connected to the suction inlet of a Venturi for ink top-up.

In arrangements where the priming connector 87 is connected both to the priming line 89 and to the ink top-up line 57, it is not necessary for the other end of the priming line 89 to be connected directly to the ink feed tank. As with the arrangements in which the ink cartridge 63 has to be moved, the priming line 89 can be connected to a position elsewhere in the ink circuit. Accordingly, FIG. 15 shows a modified arrangement based on the arrangement of FIG. 12, in which the ink cartridge 63 does not need to be moved and the priming line 89 joins the line from the Venturis 35, 49 to the ink feed tank 27. Similarly, FIG. 16 shows a modification to the arrangement of FIG. 13 in which the priming connector 87 is connected to the ink top-up line 57 as well as to the priming line 89, and the priming line 89 joins the ink circuit between the ink tank 27 and the ink pump 31.

Figure 16:
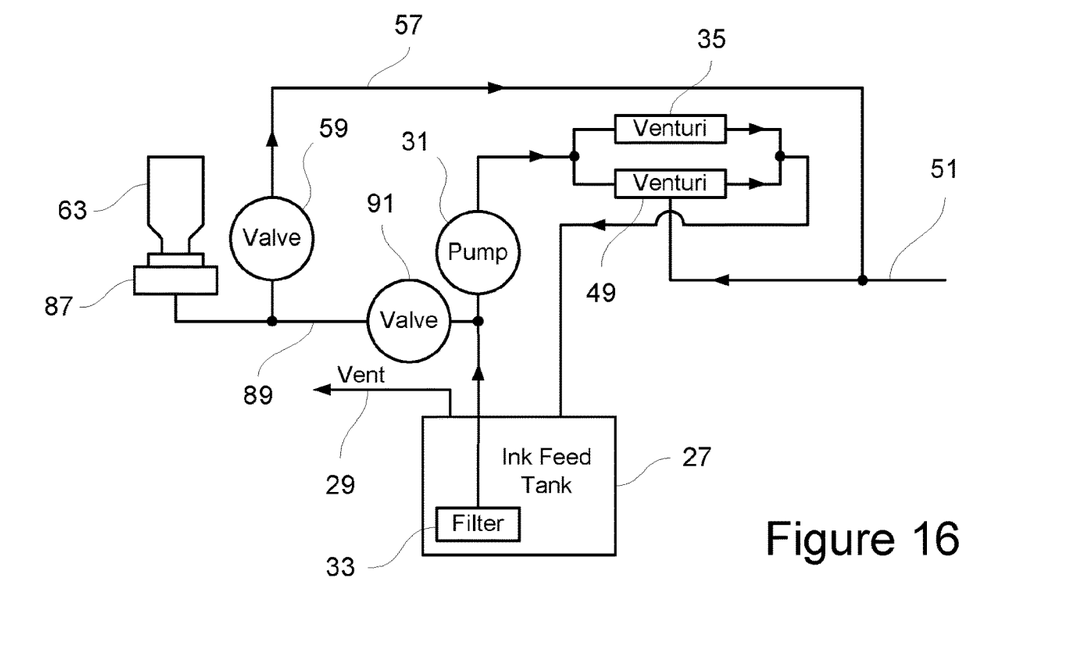
FIG. 16 is a modification of FIG. 13, in which the priming connector is also connected to the suction inlet of a Venturi for ink top-up.
Figure 17:
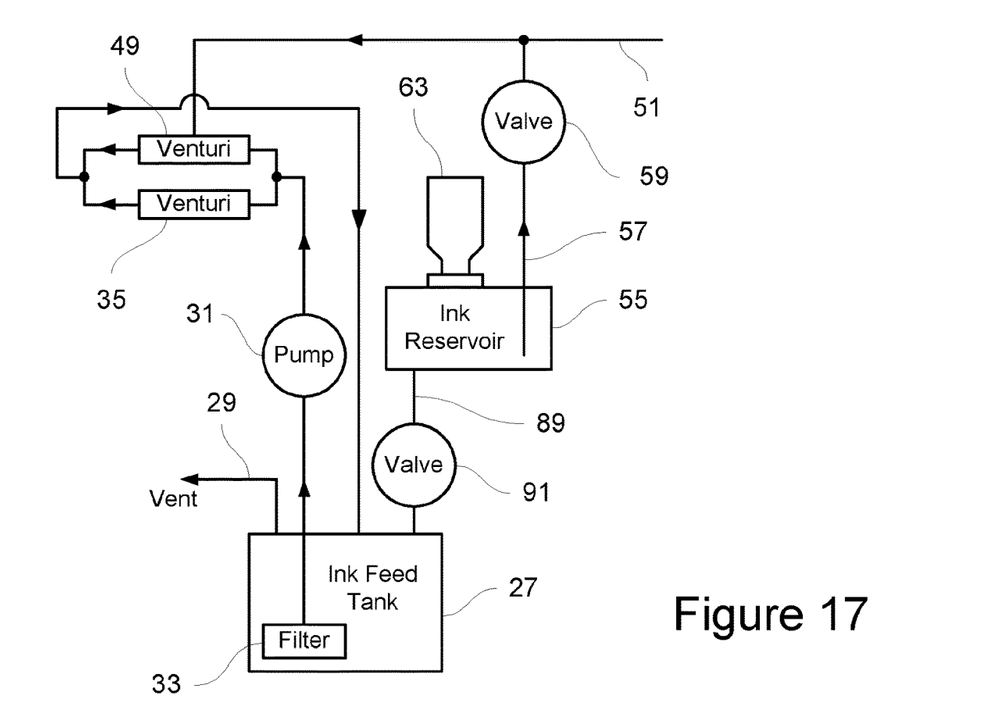
FIG. 17 is a schematic diagram of the main ink circuit from the ink system of FIG. 4, with the ink cartridge fitted to the ink reservoir which is in turn connected to both the ink tank for priming and to the suction inlet of a Venturi for top-up.

In FIGS. 14 to 16 there is no ink reservoir 55. As mentioned above, it is possible to omit the ink reservoir since the second Venturi 49 can suck ink directly out of the ink cartridge 63 during an ink top-up operation. If an ink reservoir 55 is provided in an arrangement such as those shown in FIGS. 14 to 16, there will be a tendency when the ink cartridge 63 is squeezed for ink from the ink cartridge to flow into the ink reservoir 55 and collect there, without the ink travelling along the priming line 89 and reaching the ink circuit. In this case, the priming operation would fail to transfer ink into the ink circuit to prime it and so the Venturis 35, 49 would fail to develop suction.

However, it is possible to provide an ink reservoir 55 even in arrangements where the ink cartridge 63 stays in the same position both for the priming operation and the ink top-up operation, if there is some way of transferring ink from the ink reservoir 55 to the ink circuit during the priming operation. An example of such an arrangement is show in FIG. 17. The ink system layout in FIG. 4 and FIGS. 10 to 17 is purely schematic and does not indicate the physical locations of components. However, in the arrangement of FIG. 17 the ink reservoir 55 is positioned above the ink feed tank 27 so that ink can flow from the ink reservoir 55 to the ink feed tank 27 under the influence of gravity when the priming shut off valve 91 is open. In this arrangement, the priming shut off valve remains necessary, both to prevent unwanted flow from the ink reservoir 55 into the ink feed tank 27 during normal operation and to protect the ink feed tank 27 from suction during an ink top-up operation.

In the illustrated embodiments, the ability to transfer ink from the ink cartridge 63 by squeezing or compressing the ink cartridge 63 during a priming operation has the result that the ink circuit can be primed with ink without the need to provide a diaphragm pump or other pump that can operate without priming. Once the ink circuit is primed with sufficient ink, the ink pump 31 can pump ink through the Venturis 35, 49 and these can develop sufficient suction to withdraw further ink from the ink cartridge 63, both to fill the ink feed tank 27 to its normal operating level when the printer is commissioned following replacement of the ink feed tank 27, and during an ink top-up operation. Accordingly, the diaphragm pump (or other pump that can function without priming) is not needed at all during operation of the printer and can be omitted, with a consequent saving of cost and space inside the main printer body 1.

The designs of FIGS. 14 to 17 may be more convenient for the operator because the ink container 63 does not need to be moved from a priming position to a top-up position. However, these designs require that it is possible to squeeze or otherwise compress the ink container 63 when it is in the position it will have during normal operation of the printer. If it is desired that the ink container is enclosed within the main printer body 1 during operation of the printer, this may require the main printer body to be designed with space around the position of the ink container 63 to allow access for squeezing or compression. As a result, the main printer body 1 may be larger than would otherwise be necessary. In the designs of FIGS. 6 to 13, the ink cartridge may be partially outside the main printer body 1 when it is in its priming position, allowing easy access for squeezing the ink cartridge 63 (as shown in unbroken lines in FIG. 9). The ink cartridge 63 is then moved, after the priming operation, to its top-up position. In this case, the top-up position can be wholly enclosed within the main printer body 1 (as shown in broken lines in FIG. 9) without the need to provide space for access to allow squeezing, enabling the printer to be more compact.

The embodiments described above and illustrated in the drawings are provided by way of non-limiting example and further embodiments will be apparent to those skilled in the art.

The invention claimed is:

1. A continuous ink jet printer comprising an ink tank, an ink pump and at least one suction device, the ink tank, the ink pump and the at least one suction device being provided in an ink circuit in which the ink pump can pump ink from the ink tank through the ink pump and then to a first inlet of the at least one suction device at which the at least one suction device receives ink from the ink pump, through the at least one suction device and then back to the ink tank, the at least one suction device having at least one suction inlet and being arranged to create suction at said at least one suction inlet from the flow of ink through it from the first inlet, the printer further comprising:

an ink top-up line connected to the ink circuit at a suction inlet of the at least one suction device to allow ink to be sucked into the ink circuit by suction from the suction inlet, a solvent or diluent top-up line connected to the ink circuit at a suction inlet of the at least one suction device to allow solvent or diluent to be sucked into the ink circuit by suction from the suction inlet, and a first fitting for connecting an ink container to the ink circuit at the ink tank or at a location in the ink circuit that is (a) between an outlet of the at least one suction device and an inlet of the ink tank or (b) between an outlet of the ink tank and an inlet of the ink pump or (c) between an outlet of the ink pump and said first inlet of the at least one suction device.

2. A continuous ink jet printer according to claim 1 in which the first fitting comprises a hollow spike to pierce a part of an ink container.

3. A continuous ink jet printer according to claim 2 in which the first fitting further comprises a recess to accommodate part of an ink container, and the hollow spike is mounted in the recess to pierce a part of an ink container received in the recess.

4. A continuous ink jet printer according to claim 1 in which the first fitting connects the ink container both (i) to the ink tank or the said location in the ink circuit and (ii) to the ink top-up line, and the printer comprises a valve between the first fitting and the ink tank or the said location.

5. A continuous ink jet printer according to claim 1 in which the first fitting does not connect the ink container to the ink top-up line, and the printer comprises a second fitting for connecting an ink container to the ink top-up line.

6. A continuous ink jet printer according to claim 5 in which the second fitting is at a position within a body of the printer so that an ink container is wholly inside the body of the printer when the ink container is positioned on the second fitting, and the first fitting is at a position such that the same ink container, if positioned on the first fitting, extends at least partially outside the body of the printer.

7. A continuous ink jet printer according to claim 5 in which the first fitting is on the top of the ink tank.

8. A continuous ink jet printer according to claim 4 in which the fitting that connects the ink container to the ink top-up line is arranged to hold the ink container in a liquid-tight manner.

9. A continuous ink jet printer according to claim 1 in which the ink top-up line and the solvent or diluent top-up line are connected to the ink circuit at the same suction inlet of the same suction device as each other.

10. A method of priming an ink circuit in a continuous ink jet printer, wherein the ink circuit comprises an ink tank, an ink pump and at least one suction device, the at least one suction device having a first inlet connected to receive ink from the ink pump and at least one suction inlet and being arranged to create suction at said at least one suction inlet from the flow of ink through it from the first inlet, and wherein the printer further comprises:

an ink top-up line connected to the ink circuit at a suction inlet of the at least one suction device to allow ink to be sucked into the ink circuit by suction from the suction inlet, a solvent or diluent top-up line connected to the ink circuit at a suction inlet of the at least one suction device to allow solvent or diluent to be sucked into the ink circuit by suction from the suction inlet, and a first fitting for connecting an ink container to the ink circuit at the ink tank or at a location in the ink circuit between an outlet of the at least one suction device and an inlet of the ink tank or at a location in the ink circuit between an outlet of the ink tank and an inlet of the ink pump or at a location in the ink circuit between an outlet of the ink pump and an inlet of the at least one suction device at which the at least one suction device receives ink from the ink pump, the method comprising positioning an ink container on the first fitting and compressing it to force ink from the ink container through the first fitting into the ink circuit.

11. A method according to claim 10 in which the method further comprises removing the ink container from the first fitting when sufficient ink has been forced into the ink circuit to enable the ink pump to withdraw ink from the ink tank, and subsequently positioning the ink container on a second fitting for connecting an ink container to the ink top-up line.

12. A method according to claim 11 in which a part of the ink cartridge that is positioned on the first fitting comprises a resealable septum, and the first fitting comprises a hollow spike that pierces the septum when the ink cartridge is place in the first fitting.

\* \* \* \* \*